June 7, 1932.   P. H. JOHNSON   1,862,269
PNEUMATIC TIRE
Filed March 14, 1929   2 Sheets-Sheet 1
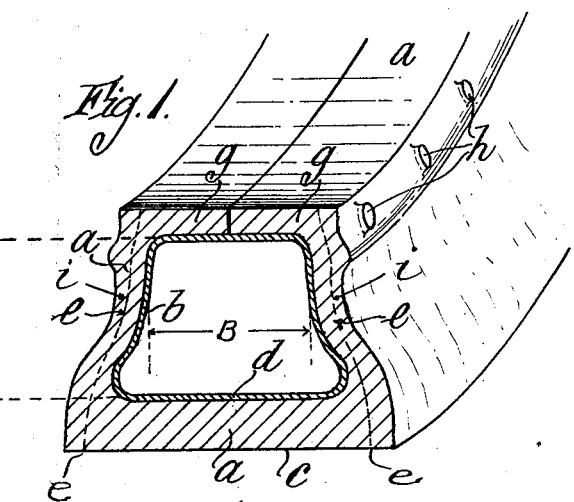
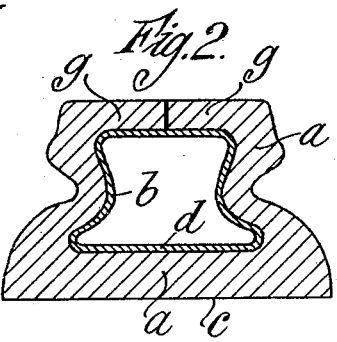
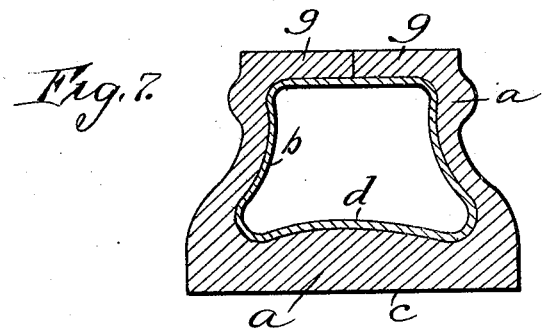
Inventor
Philip H. Johnson
By his Attorneys,
Baldwin & Wight

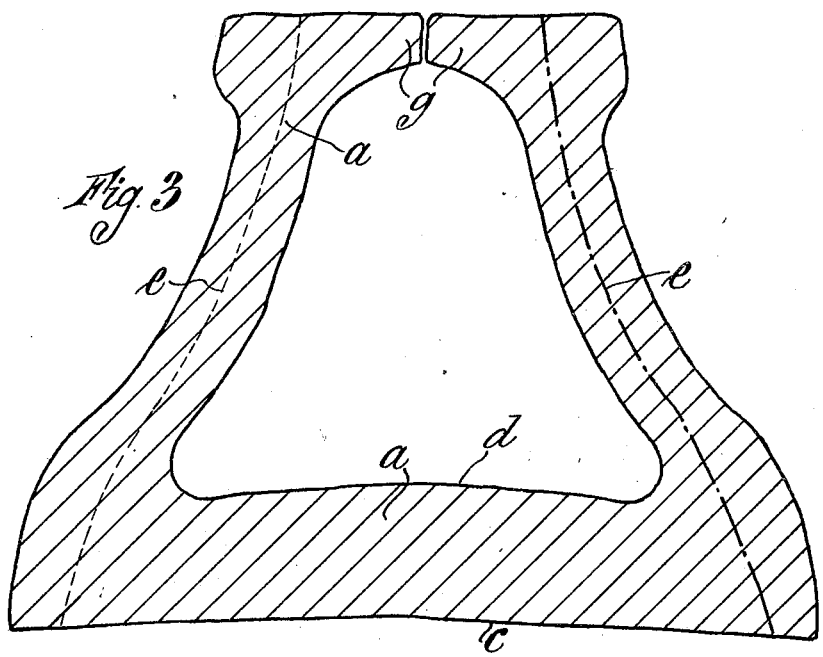
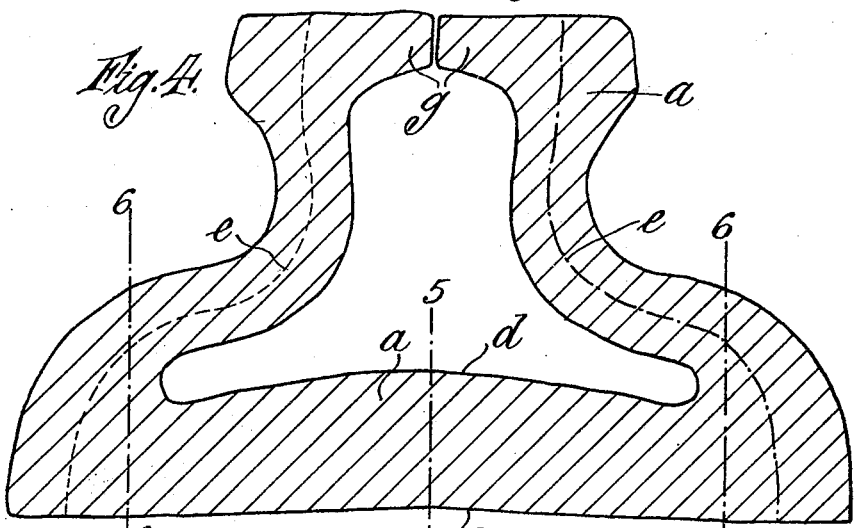
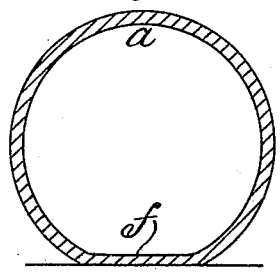
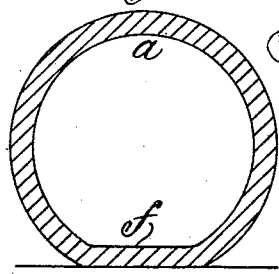

Patented June 7, 1932

1,862,269

UNITED STATES PATENT OFFICE

PHILIP HENRY JOHNSON, OF HOUNSLOW, ENGLAND, ASSIGNOR TO ROADLESS TRACTION, LIMITED, OF HOUNSLOW, MIDDLESEX, ENGLAND

PNEUMATIC TIRE

Application filed March 14, 1929, Serial No. 347,003, and in Great Britain March 15, 1928.

This invention relates to improvements in pneumatic tires having a flat or substantially flat tread surface and whose side walls are bent or bulged inwardly and are deformable upon application of the load.

The object of this invention is to provide a pneumatic tire preferably for use at low internal pressure and which is especially suitable for running on soft ground, earth roads, sand etc., so designed that the shape and construction of the tread and walls of the tire assist, in combination with the low air pressure, in the flotation of a load over this kind of ground without sinkage or damage to the surface passed over. This type of tire can also with advantage be employed over normal hard road surfaces when higher internal pressures may be used without detriment.

A further object of the invention is to minimize the risk of puncturing of the side walls of the tire.

The pneumatic tire as at present constructed is approximately of cylindrical cross section, which when under load and the air pressure inside the tire is low enough assumes an elliptical cross section, so that the area of the tread in contact with the ground is increased.

On hard level ground the actual portion of the tread in contact with the ground is, of course, flat, but on very soft ground the tire tends to resume its normal elliptical or even cylindrical section, with the result that the impression made on soft ground is trough shaped, deepest at its centre and as the tire rolls forward, the centre portion of the tread sinks further than the outer edges and so forces soft ground to each side, thereby assisting the tire to sink further. The rolling resistance is also increased under these conditions not only by the sinkage but by the fact that varying diameters of tire are in contact with the ground at the same time.

According to one feature of the present invention a pneumatic tire comprising an outer cover and an inner tube has the outer cover formed with a flat or substantially flat tread in combination with side walls which when unladen bulge inwardly, the distance between the side walls at the point of maximum bend when the tire is unladen being less than the width of the inner tread surface and the bend towards one another increasing under load.

According to another feature of this invention the minimum distance between the side walls at the point of maximum bend, when the tire is laden, is less than the width of the inner tread surface.

In some cases the tire is constructed so that its cross section, when unloaded and at normal running pressure is slightly concave at the outer surface of the tread. Preferably the tread is wider than the wheel rim.

With a tire constructed in accordance with this invention it will be found that its resistance produces an even distribution of the pressure on the ground surface or a greater distribution at the edges of that portion of the tread in contact with the ground than at the centre.

The tire is circumferentially flexible in the normal manner but preferably at the tread it is laterally stiff, and stiffening means may be provided in the tread for this purpose.

Both the inner and outer tread surfaces may conform with one another and if the tread is only slightly arched or convex on its inner surface, internal pressure cannot flatten it to any appreciable extent owing to its circumferential inextensibility.

The outer surface of the walls of the outer cover are more or less concave in cross section so that they bulge or tend to bulge inwards towards each other, which bulge inwards increases under load.

It is clear that the extent of the bulge may vary within wide limits but it must be such that the walls of the tire on application of the load tend to move inwardly towards each other. Moreover the initial extent of the bulge, the thickness, consistency and depth of the walls, must be sufficient to resist any tendency to bulge outwardly under the internal air pressure.

The advantages in this construction of the walls of a tire are several, the most obvious being that as the tread is always wider than the walls, it protects the walls from puncture.

Further, the effect of the air pressure on the walls is to tend to push them apart, thus tending to flatten them and compress the material of which they are made, so that the fabric, or other reinforcing material, may be dispensed with.

It will be realized, therefore, that with a tire constructed in accordance with this invention, its tendency is not to force outwardly the ground over which it runs, but to compress and consolidate it, whereby sinkage is considerably reduced. Further the area of the tire in contact with the ground will be greater than that in the case of an ordinary tire and is substantially rectangular in shape, the resistance being preferably greater at the edges of the rectangle than at the centre. This effect is contributed to by the form of both walls and tread.

By means of this invention a tire, for a given width may be made shallower in section, allowing if desired a larger diameter rim to be used, thereby holding the tire more securely and permitting the use of a larger brake drum. An additional advantage is that tires constructed in accordance with this invention may be run deflated for considerable distances without damage.

A further and notable advantage with tires constructed in accordance with this invention arises from the fact that it has been observed during tests that when a vehicle fitted with these tires is steered the tread of the tire lays itself upon the ground in a curve corresponding to the curve or path of steering of the vehicle. In other words the tread is steerable independently of the wheel. The principal reason for this is that as distinct from conventional practice the tire walls approach very nearly to the neutral vertical axis of the turning movement of the wheel as distinct from conventional pneumatic tires where they are widely separated especially under load thus securing a mechanical advantage of the wheel over the tread and an easy distortion of the tire walls themselves. This effect is more readily obtained than would otherwise be the case due to the fact that the walls are not reinforced with canvas and are thus more resilient. Further the effect is contributed to by the large area of ground contact and consequent adhesion. The effect described is important from several points of view. Firstly skid of the tread in contact with the ground is prevented which thereby minimizes wear, secondly the efficiency of the vehicle is thereby increased and thirdly a most important result is that tires of this construction can be utilized with great advantage for multi-wheeled vehicles without making special provision for the steerability of all wheels true steering effect being obtained in such constructions without skid effect either of the tread itself or of the wheel as a whole.

The invention is diagrammatically illustrated in the accompanying drawings in which Figure 1 is a part sectional perspective view of a tire constructed in accordance with the invention. Figure 2 is a section of the tire in Figure 1 as it appears when loaded. Figures 3 and 4 are similar views of a similar form of tire. Figures 5 and 6 are circumferential sections to a much smaller scale on the lines 5—5 and 6—6 of Figure 4. Figure 7 is a transverse sectional view of a modified form of tire when unloaded.

Referring to the drawings $a$ indicates the outer cover and $b$ the inner tube. $c$ and $d$ are respectively the outer and inner tread surfaces.

In Figures 1 and 2 the outer tread surface $c$ is substantially flat.

In Figures 3 and 4 the tread surface $c$ is concave, the inner tread surface $d$ being correspondingly arched or convex.

The walls of the tire have an initial inward bend, as denoted by the outward concavity of the contour line $e$—$e$ of the outer walls of the tire. The initial inward bend increases under load as can be seen from the increase of concavity of the line $e$—$e$ in Figure 4.

It is to be understood that the point of bend of the side walls is located at or adjacent the centre of the side walls and is indicated by the arrows $i$—$i$, and according to one feature of the invention the distance between the two walls at the maximum point of bend, when the tire is unladen, is less than the width of the inner tread surface $d$. The maximum bend of the side walls, when the tire is laden, is illustrated in Figures 2 and 4 when according to another feature of the invention the minimum distance, that is the distance between the side walls at this point of maximum bend, when the tire is laden, is less than the width of the inner tread surface $d$.

It is clear that the resistance to bending of the tire at the centre of the tread apart from the resistance of the rubber or strengthening is dependent solely upon the air pressure, but at the edges or sides of the tread considerable resistance is offered to deflection by the stiffness of the walls in addition to the air pressure inside the tire. The air pressure inside is trying to flatten the walls or bulge them outwardly thus materially adding to their resistance to inward deflection. It will be understood therefore that when considering a cross section of the tire the centre of the tread is supported by air only and the edges of the tread are supported by the stiffness of the walls reinforced by the air pressure.

This effect is obtained from the construction shown in Figures 1 and 2 where the tread is flat and contacts with the ground but in Figures 3 and 4 additional loading at the sides of the tread or pressure per square inch upon the ground is provided by the concave form of the tread.

Referring to Figures 5 and 6 the flattened portion of the tire in contact with the ground is indicated at $f-f$. The resistance of the sides of the tread is greater due to the larger mass of material and also the resistance of the walls as stated above. Ground contact is made over an area of rectangular shape and at the ends of the rectangle the resistance to deflection given by the walls is greater than in the centre of this rectangle for the simple reason that the walls at the end are less deflected than in the centre of this rectangle or flat portion thus offering more resistance than in the centre where they have already been deflected to an appreciable extent.

It will thus be seen that the approximately rectangular contact between the tire and the ground is subjected to a very even pressure, tending to be a maximum at the sides and ends.

The air pressure inside the tire tends to resist the inward deflection of the walls thus supporting them and assisting in the support of the tread of the tire which already is in part provided by the form of the walls.

The walls of the tire terminate in a foot or base indicated at $g-g$ shown with abutting edges but any other convenient shape may be employed. Bosses $h$ or other means may be provided for preventing creep and adapted to fit into corresponding recesses in the wheel rim (not shown). The drawings show a smooth tread having no pattern but the tire may be formed with any type of suitable pattern and preferably this pattern is one which is raised to a slight extent in the centre of the tread to facilitate steering of the tire.

While it is practicable with tires in accordance with this invention to employ the conventional inner tubes of cylindrical cross section inner tubes shaped to conform with the shape of the outer covers as shown in the drawings are to be preferred.

What I claim is:—

1. A pneumatic tire comprising an inner tube and a casing enclosing the same, said casing having a substantially flat rim-engaging wall, a substantially flat tread wall wider than the first mentioned wall and having substantially parallel inner and outer surfaces, and side walls connecting said first and second walls, said side walls being inwardly concave substantially throughout their width and spaced a considerable distance apart, thereby insuring inward flexing of the side walls under load without interference, the interior of said casing being substantially unobstructed, the space between the side walls being such that even when the tire is loaded said side walls do not touch.

2. A pneumatic tire comprising an inner tube and a casing enclosing the same, said casing having a rim-engaging wall, a substantially flat tread wall wider than the first mentioned wall, and side walls connecting said first and second walls, said side walls generally extending inwardly from the tread toward the first mentioned wall whereby they are closer together at the latter than at the tread, thereby insuring inward flexing of the wide walls under a load, said side walls being spaced a substantial distance part and the interior of the casing being substantially unobstructed, the space between the side walls being such that even when the tire is loaded said side walls do not touch.

3. A pneumatic tire having a casing provided with a rim engaging wall, a substantially flat tread wall wider than said rim-engaging wall, and side walls connecting said first and second walls, said side walls substantially throughout their length being inwardly concave, and an inner tube reinforcing said side walls and urging them toward a flattened position.

4. A pneumatic tire having a casing provided with a rim-engaging wall, a substantially flat tread wall wider than said rim-engaging wall, and side walls connecting said rim-engaging wall and said tread wall, said side walls substantially throughout their length being inwardly concave, the relative dimensions and arrangement of said walls being such that the pressure exerted on the ground by said tread wall when the tire is loaded is greater at the edges than at the central portion thereof.

In testimony that I claim the foregoing as my invention I have signed my name this 28th day of February, 1929.

PHILIP HENRY JOHNSON.